No. 875,341. PATENTED DEC. 31, 1907.
A. FRANK.
CENTERING AND MEASURING INSTRUMENT.
APPLICATION FILED MAY 27, 1907.
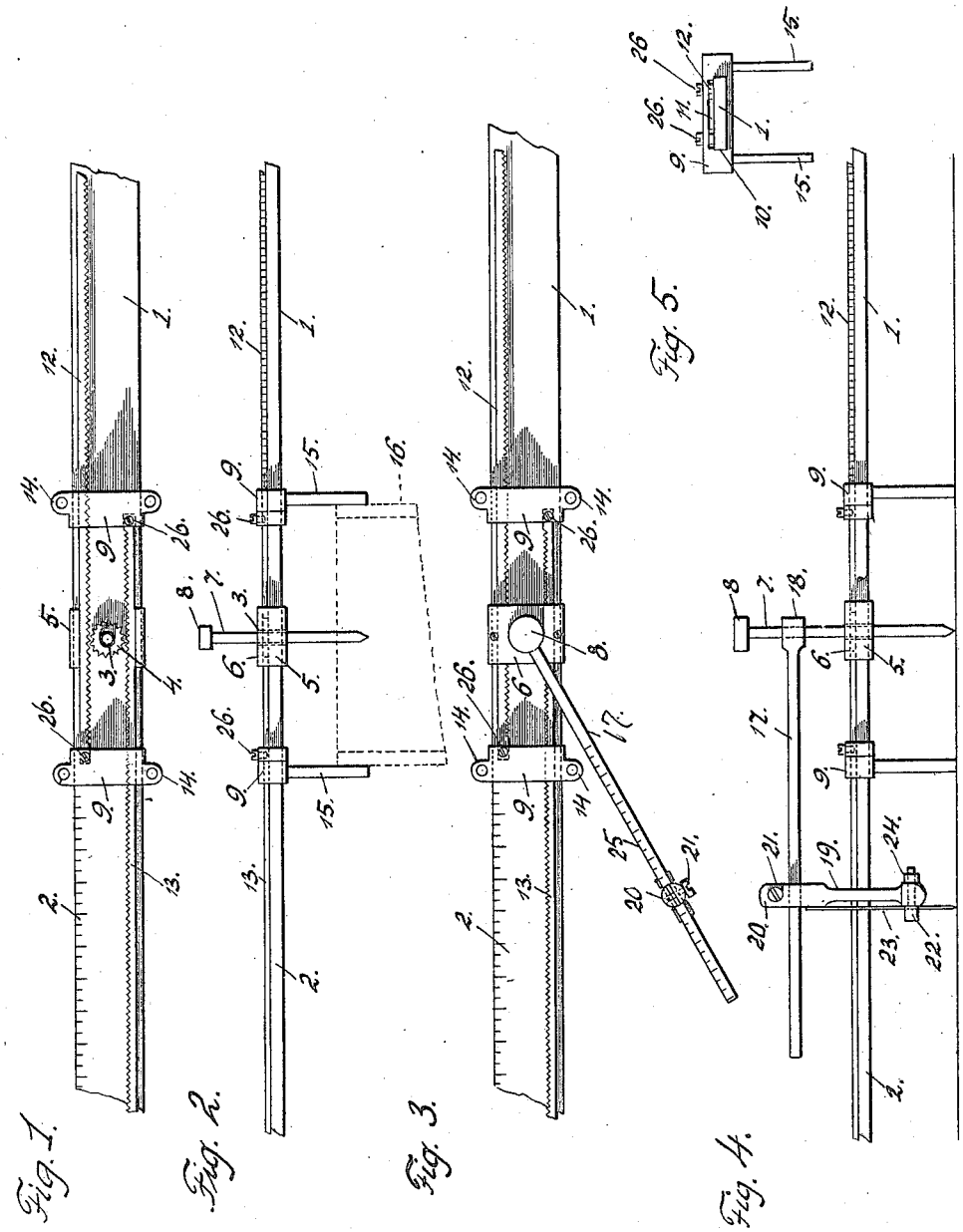
WITNESSES
A. H. Rabsag,
A. J. Trigg.
INVENTOR
Anton Frank,
BY H. C. Everett
Attorneys

UNITED STATES PATENT OFFICE.

ANTON FRANK, OF BRADDOCK, PENNSYLVANIA.

CENTERING AND MEASURING INSTRUMENT.

No. 875,341.          Specification of Letters Patent.          Patented Dec. 31, 1907.

Application filed May 27, 1907. Serial No. 375,861.

*To all whom it may concern:*

Be it known that I, ANTON FRANK, a citizen of the United States of America, residing at Braddock, in the county of Allegheny and State of Pennsylvania, have invented certain new and useful Improvements in Centering and Measuring Instruments, of which the following is a specification, reference being had therein to the accompanying drawing.

This invention relates to centering and measuring instruments designed for measuring the diameter of tubes or like cylindrical objects.

The improvement is also adapted for use in connection with a graduated arm and compass for projecting circles and segments in laying out works.

The invention comprises a base-strip or rule formed with a central opening, a pinion wheel having a hollow axial support extending through said opening, oppositely disposed longitudinally-movable racks on opposite sides of said pinion, and movable slides on said strip or rule one end of each of said racks being secured to one of said slides.

The invention also consists in a compass-attachment and other features of construction, all of which will be fully described hereinafter in connection with the accompanying drawing and set forth in the appended claims.

In the drawing:—Figure 1 is a top plan view of the device with the cover plate of the central housing thereof removed, Fig. 2 is a side elevation of the same with the cover plate in position and showing the device applied to the end of the tube, Fig. 3 is a top plan of the improvements with its compass attachment in position, Fig. 4 is a side elevation of Fig. 3 and Fig. 5 is an end elevation with the center pin removed.

The reference numeral 1 designates a base-strip or rule, formed along its upper surface at one of its edges with graduations 2, and at its center with a circular opening to receive a sleeve 3 upon which is revolubly mounted a pinion wheel 4. A housing 5 of rectangular form encompasses the strip 1 at the center of its length, the bottom and removable cover-plate 6 of said housing being each formed with an opening registering with the opening in the strip and receiving the ends of the sleeve 3. A removable center pin 7 having a head 8 extends through the sleeve 3, and at each side of the housing 5 a slide 9 is loosely supported upon the strip 1, said slides each having an elongated opening 10 for the passage of the strip or rule. The upper wall of each of the openings 10 is recessed as at 11 to accommodate two oppositely disposed longitudinally-movable racks 12 and 13 having teeth on the inner edges meshing with the teeth of the pinion wheel 4. The inner ends of these racks overlap and extend through the housing 5 and are secured one to each of the slides 9. The ends of the slides 9 are formed with perforated lugs 14 for the attachment of pins 15 which serve as gages to bear against the sides of a pipe or tube 16 as illustrated in Fig. 2.

By the construction thus far described, it will be apparent that the revolution of the pinion wheel 4 by the movement of either of the slides will move the two racks 12 and 13 simultaneously, but in opposite directions and thus bring the gage pins 15 of the two slides the same distance away from the center pin 7, and as illustrated in Fig. 2 the center point of the diameter of a tube or other cylindrical body may be accurately determined by the adjustment of the device therein, the measurements thus obtained transferred to paper or to material to be worked upon.

In Figs. 3 and 4 I have shown the centering device with a compass attachment applied thereto, consisting of a sweep 17 formed at one end with a bearing 18 through which the center pin 7 extends, a depending arm 19 having a split bearing 20 for the passage of the sweep and adjustably secured thereon by a set screw 21; and a marker arm 22 extending through a circular transveres opening in the lower end of the arm 19, and provided with an opening for the passage of a pencil 23 or other marker, which is adjustably secured by a nut 24 fitting upon the projecting threaded end of the marker arm 22. The sweep arm 17 is provided with graduations 25, and the arm 19 may be adjusted by these graduations, with relation to those upon the strip or rule 1.

The slides 9 are removably secured to the racks 12 and 13 by screws 26, and the device may be utilized as a measuring instrument by the use of only one of said slides.

Having fully described my invention what I claim and desire to claim by Letters Patent, is:—

1. In a centering and measuring device, a base strip or rule, a pinion carried on the upper face thereof centrally of the length of the strip or rule, a housing inclosing the pinion, slides mounted on said rule and provided with apertured ears at each end, gage pins carried by said apertured ears, and a pair of racks arranged on the rule to engage said pinion, one end of one rack being connected to one of the slides and one end of the other rack being connected to the other slide.

2. In a centering and measuring device, a graduated rule having an opening centrally of its length, a sleeve mounted in said opening, a pinion mounted on said sleeve, a housing inclosing the sleeve and pinion and having openings in the upper and lower faces alining with said sleeve, slides mounted upon said rule, gage pins carried by said slides outside the rule, racks on the rule arranged one on each side of the pinion and connected one to each slide, a center pin mounted in said housing and sleeve, a graduated sweep carried by the center pin, and a marker adjustably mounted on said sweep.

In testimony whereof I affix my signature in the presence of two witnesses.

ANTON FRANK.

Witnesses:
MAX H. SROLOVITZ,
JOHN FRANK.